United States Patent
Asano et al.

(10) Patent No.: US 6,977,617 B2
(45) Date of Patent: Dec. 20, 2005

(54) HIGH-FREQUENCY RECEIVING UNIT AND HIGH-FREQUENCY RECEIVING METHOD

(75) Inventors: Toshio Asano, Fukaya (JP); Shuji Abe, Kumagaya (JP); Koji Shingu, Fukaya (JP); Tooru Umino, Fukaya (JP); Masahiro Sekine, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1 day.

(21) Appl. No.: 10/812,071

(22) Filed: Mar. 30, 2004

(65) Prior Publication Data

US 2004/0227677 A1    Nov. 18, 2004

(30) Foreign Application Priority Data

May 12, 2003   (JP) .............................. 2003-133374

(51) Int. Cl.$^7$ .............................................. H01Q 1/24
(52) U.S. Cl. ..................................................... 343/702
(58) Field of Search ......................... 343/702, 700 MS, 343/725, 872, 844

(56) References Cited

U.S. PATENT DOCUMENTS 6,636,181 B2 * 10/2003 Asano et al. ................ 343/702
6,642,892 B2    11/2003 Masaki et al. ............... 343/702
2002/0053878 A1    5/2002 Masaki et al. ................ 315/82
2003/0222823 A1 * 12/2003 Flint et al. .................... 343/702

FOREIGN PATENT DOCUMENTS

| JP | 8-23482 | 1/1996 |
|---|---|---|
| JP | 10-262199 | 9/1998 |
| JP | 10-308941 | 11/1998 |
| JP | 10-313208 | 11/1998 |
| JP | 2002-51928 | 5/2002 |

* cited by examiner

Primary Examiner—Hoang V. Nguyen
(74) Attorney, Agent, or Firm—Pillsbury Wintrhop Shaw Pittman, LLP

(57) ABSTRACT

A high-frequency receiving unit is provided with a casing configured to incorporate a high-frequency circuit which receives a high-frequency signal and a signal processing circuit which obtains at least one of a picture signal and a data signal from the received high-frequency signal, a display disposed in an opening of the case and configured to display the output of the signal processing circuit, and an antenna configured to receive the high-frequency signal and to supply it to the high-frequency circuit, wherein the antenna is disposed in any one of a top surface, a bottom surface, a right side surface, a left side surface and a back surface on the back side of an intermediate position for dividing the casing into two portions in the direction of depth.

16 Claims, 5 Drawing Sheets

HIGH-FREQUENCY RECEIVING UNIT AND HIGH-FREQUENCY RECEIVING METHOD

CROSS-REFERENCE TO RELATED APPLICATIONS

This application is based upon and claims the benefit of priority from prior Japanese Patent Application No. 2003-133374, filed May 12, 2003, the entire contents of which are incorporated herein by reference.

BACKGROUND OF THE INVENTION

1. Field of the Invention

The present invention relates to a high-frequency receiving unit and a high-frequency receiving method suitably used for a portable broadcast receiving terminal or the like for receiving especially satellite digital broadcast.

2. Description of the Related Art

As is well known, at the present, a satellite digital broadcast system using a frequency band of 2.6 GHz has been developed. The main service target of this satellite digital broadcast system is mobile units such as a portable broadcast receiving terminal.

Further, this satellite digital broadcast system is not only positioned as digital audio broadcast of high audio quality but also is greatly expected as broadcast media capable of delivering multimedia contents including simple moving pictures to the mobile units.

Other novel media include a terrestrial digital broadcast system designed for fixed receivers, but this system limits the region where the receivers can receive the broadcast and is predicated on the receivers being used near a transmitting antenna. However, in the above satellite digital broadcast system, broadcast radio waves can be received in any places where the broadcast radio waves from a geostationary satellite arrive.

The portable broadcast receiving terminals under the present state commonly use rod antennas as antennas but terminals mounted with helical antennas have also come on the market.

However, in these structures, the antenna is protruded outside from the main body of the broadcast receiving terminal and hence is inconvenient for carrying the terminal, which creates a need to improve the antenna in terms of user's handling.

Further, in order to cope with this problem, it is thought that a chip antenna is used as the antenna. By adopting this chip antenna, the antenna itself is not protruded outside from the main body of the broadcast receiving terminal.

However, when the chip antenna is packaged, the circuit pattern and its peripheral earth pattern of a printed circuit board need to be removed. There is presented a problem that the chip antenna expands a substantial footprint wide to impair reducing the physical size of the chip.

Still further, the user operates the portable broadcast receiving terminal and watches or listens to broadcast contents with the terminal in his hand. For this reason, at the time of putting the satellite digital broadcast system into practical use, it is necessary to take measures to make the broadcast receiving terminal effectively receive broadcast radio waves from the satellite without interference.

In particular, in the satellite digital broadcast system, there are cases where broadcast contents are only audio, so it is envisaged that the user receives the broadcast contents with the terminal in the pocket of user's clothes without watching a display screen.

In this case, since the position of the broadcast receiving terminal in vertical and horizontal directions is not determined, the broadcast receiving terminal needs to satisfy as wide directivity as possible so that it can receive broadcast under good conditions even if it is placed in any direction.

Here, in Jpn. Pat. Appln. KOKAI Publication No. 10-308941 is disclosed a satellite broadcast system which can be received by a simple receiver responding to needs not only for indoor use but also for mobile unit or portable unit. However, in this Jpn. Pat. Appln. KOKAI Publication No. 10-308941 is disclosed a configuration of improving the transmitting antenna itself of the satellite and hence is not suitable for commercialization.

Further, in Jpn. Pat. Appln. KOKAI Publication No. 8-23482 is disclosed an antenna control device which is applied to a television set used in a mobile state such as a liquid crystal television set and the like and can receive pictures and audios under stable good conditions.

However, in this Jpn. Pat. Appln. KOKAI Publication No. 8-23482, signals received by two receiving antennas are added and the gain of the signal received by one receiving antenna is controlled on the basis of the added signal level. Hence, a circuit construction increases in complexity and hence is not suitable for commercialization.

Further, in Jpn. Pat. Appln. KOKAI Publication Nos. 10-262199 and 10-313208 is disclosed a configuration in which a plurality of antennas are packaged in the case of a portable receiving unit. However, in these Jpn. Pat. Appln. KOKAI Publication Nos. 10-262199 and 10-313208, there is disclosed a configuration that the plurality of antennas are connected in series to obtain a plurality of resonant frequencies to thereby expand a reception frequency band but there is no reference made to improving directivity characteristics for the purpose of receiving broadcast by a portable broadcast receiving terminal.

Still further, in Jpn. Pat. Appln. KOKAI Publication No. 2002-151928 is disclosed a construction in which an antenna element is arranged away from a metal element to improve directivity as a receiving unit. However, in this Jpn. Pat. Appln. KOKAI Publication No. 2002-151928, because a chip antenna is used, the footprint of an earth pattern needs to be expanded. For this reason, the chip antenna can be packaged in a portable unit having as large a size as a notebook type personal computer, for example, but it becomes difficult to put the chip antenna into practical use for a potable unit smaller than this.

BRIEF SUMMARY OF THE INVENTION

According one aspect of the present invention, there is provided a high-frequency receiving unit comprising: a casing configured to incorporate a high-frequency circuit which receives a high-frequency signal and a signal processing circuit which obtains at least one of a picture signal and a data signal from the received high-frequency signal; a display disposed in an opening of the casing and configured to display an output of the signal processing circuit; and an antenna configured to receive the high-frequency signal and to supply it to the high-frequency circuit, wherein the antenna is disposed in any one of a top surface, a bottom surface, a right side surface, a left side surface and a back surface on the back side of an intermediate position for dividing the casing into two portions in a direction of depth.

According to one aspect of the present invention, there is provided a method of receiving high frequency, comprising: receiving a high-frequency signal by an antenna disposed in any one of a top surface, a bottom surface, a right side surface, a left side surface and a back surface on a back side of an intermediate position for dividing a casing into two parts in a direction of depth; and producing a signal to be displayed on a display from a high-frequency signal received by the antenna.

DETAILED DESCRIPTION OF THE INVENTION

Figure 1:
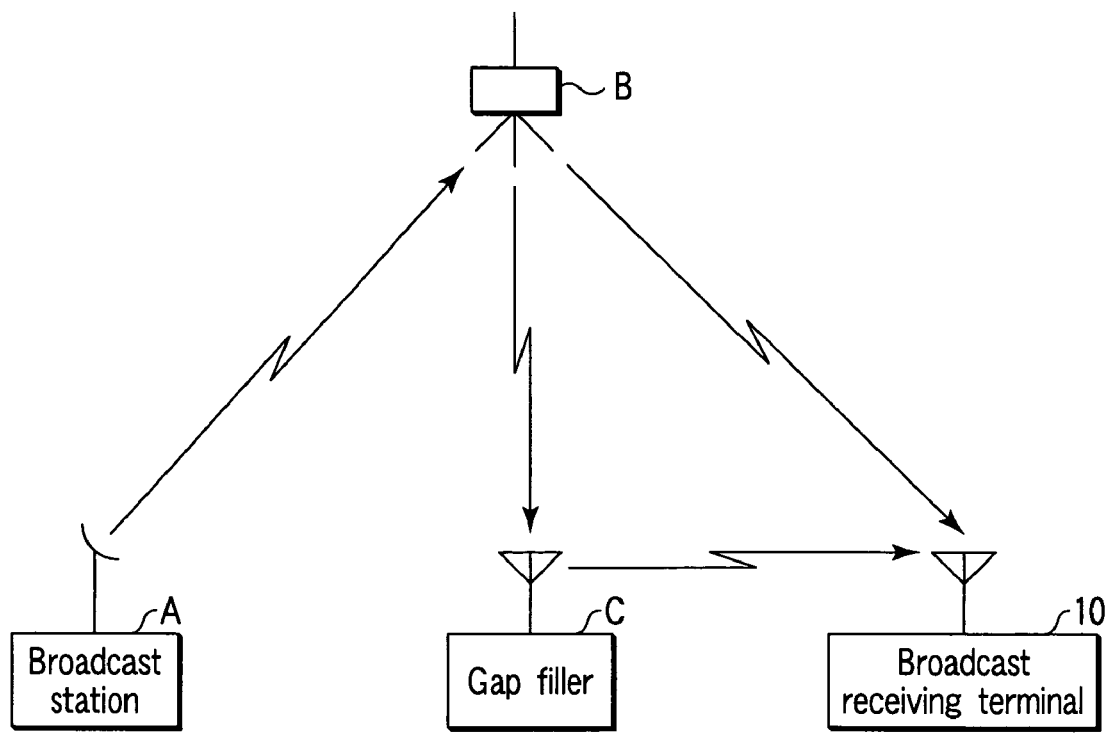
FIG. 1 shows a first embodiment of the invention and schematically shows a satellite digital broadcast system.

Embodiments of the present invention will be hereinafter described in detail with reference to the drawings. FIG. 1 schematically shows a satellite digital broadcast system to be described in a first embodiment of the invention.

That is, broadcast contents transmitted from a broadcast station A are received via a satellite B by a portable broadcast receiving terminal 10 carried by a user, thereby being made available for watching and listening to the broadcast contents by users.

Further, in this satellite digital broadcast system, broadcast radio waves from the satellite B are supplied via a gap filler C to the broadcast receiving terminal 10 existing in a place such as an indoor or underground place to which the broadcast radio waves from the satellite B do not reach.

Figure 2:
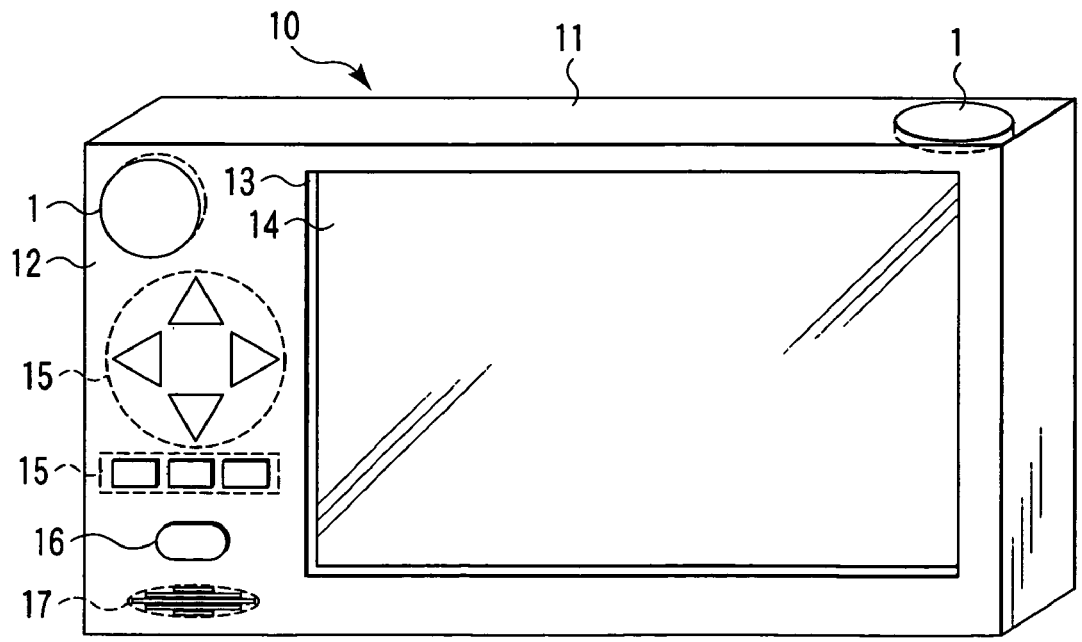
FIG. 2 is a perspective view showing the outer appearance of a broadcast receiving terminal in the first embodiment.

FIG. 2 shows the outer appearance of the above broadcast receiving terminal 10. That is, the broadcast receiving terminal 10 has a casing 11 and the casing 11 is formed in a rectangular parallelepiped. The casing 11 has an opening 13 in the front face 12 and a liquid crystal display panel 14 is mounted such that it is exposed from the opening 13.

A plurality of operating buttons 15 for switching channels, adjusting volume, and switching or adjusting the functions of the broadcast receiving terminal 10 are provided on the front face 12 and an operating button 16 for turning on/off power supply is also provided thereon. Further, a plurality of apertures 17 for guiding audio produced by a speaker to be described later are formed in this front face 12.

In the casing 11 is provided a space where the antennas 1 and the electric circuit parts of the broadcast receiving terminal 10 are received.

Figures 3, 4:
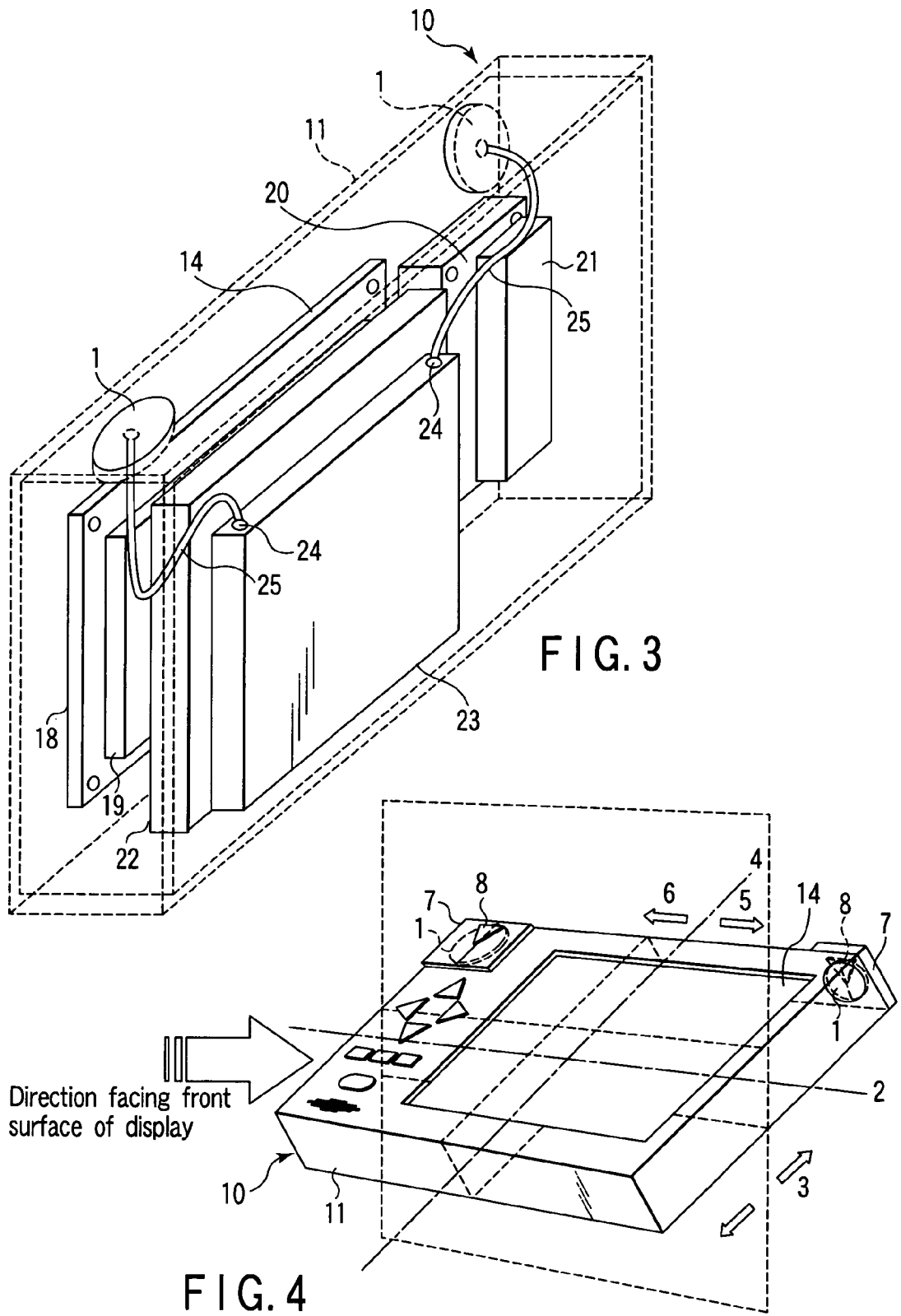
FIG. 3 is a perspective view showing the state of the broadcast receiving terminal in the first embodiment when viewed from side in the back.
FIG. 4 is a perspective view showing the positions where antennas of the broadcast receiving terminal in the first embodiment are arranged.

FIG. 3 is a perspective view showing the inside of the casing 11 when viewed from the side in the back and, for the sake of convenience of description, the casing 11 is shown by dotted lines. In FIG. 3, the liquid crystal display panel 14 has a general configuration in which a liquid crystal portion 19 is mounted on a frame-shaped printed circuit board 18 provided with a driver.

In a space on the side of this liquid crystal display panel 14 are respectively mounted a printed circuit board 20 provided with the operating buttons 15, 16, a battery receiving portion 21 for receiving a battery of operating power supply of the broadcast receiving terminal 10, and a speaker (not shown).

Further, in a space at the back of the above liquid crystal display panel 14 is mounted a block part 22 having received therein digital signal processing means that performs a processing of multiple stream signals supplied from demodulation means to be described later and outputs picture signals and audio signals.

A block part 23 covered with a sealed case and mounted on the block part 23 receives two reception means that are supplied with receiving signals from two antennas 1 to be described later and perform a processing of frequency conversion, two demodulation means that demodulate the receiving signals, combination means for combining the two demodulated signals, and channel selection means.

Moreover, the block part 22 receives also control means constructed of a microcomputer for controlling respective circuit parts of the broadcast receiving terminal 10.

Two antennas 1 are connected to the block part 23 via connectors 24 and cables 25 to supply high-frequency signals to the reception means.

FIG. 4 shows the positions where the antennas 1 are arranged. In FIG. 4, it is assumed that a region in the back of an intermediate position 2 for dividing the casing 11 into two portions in a direction of depth when a user views the liquid crystal display panel 14 of the broadcast receiving terminal 10 from the front face side (in the state of correct use or in a correct directional orientation) is a casing back portion 3.

The antennas 1 are packaged respectively in a right region 5 and a left region 6 of an intermediate position 4 for dividing this casing back portion 3 into two left and right portions. The antennas 1 are constructed of plane patch antennas and are arranged in different surfaces in the casing back portion 3 so as to expand directivity as the broadcast receiving terminal 10 and are packaged such that their respective radiant surfaces face different directions.

In this case, the distance between the two packaged antennas 1 is made not shorter than a quarter of the wavelength of a high-frequency signal to be received (in the case of satellite digital broadcast, about 30 mm or longer) to draw the best effect of a diversity antenna.

Moreover, in order to make the user recognize the position of the antennas 1 built-in the casing 11, the cases 7 of portions where the antennas 1 are packaged are partially raised and provided with markings 8.

The positions where these antennas 1 are packaged become positions where there is extremely little likelihood that when the user grasps the casing 11 in his hand at the time of operating and watching or listening to the broadcast receiving terminal 10, the user covers the antennas 1. Then, the construction and consideration of the arrangement of these antennas 1 produce also an effect of urging the user to practice a method of handling the broadcast receiving terminal 10 to always keep the characteristics of the antennas 1 in optimum conditions.

In addition, in the above positions where the antennas 1 are arranged, the positions shown in the drawing are one example and the positions where the antennas 1 are arranged are not limited to these positions. If position construction includes above elements, the position construction may be modified so that the broadcast receiving terminal 10 can receive more stable signal level under various receiving conditions.

Figure 5:
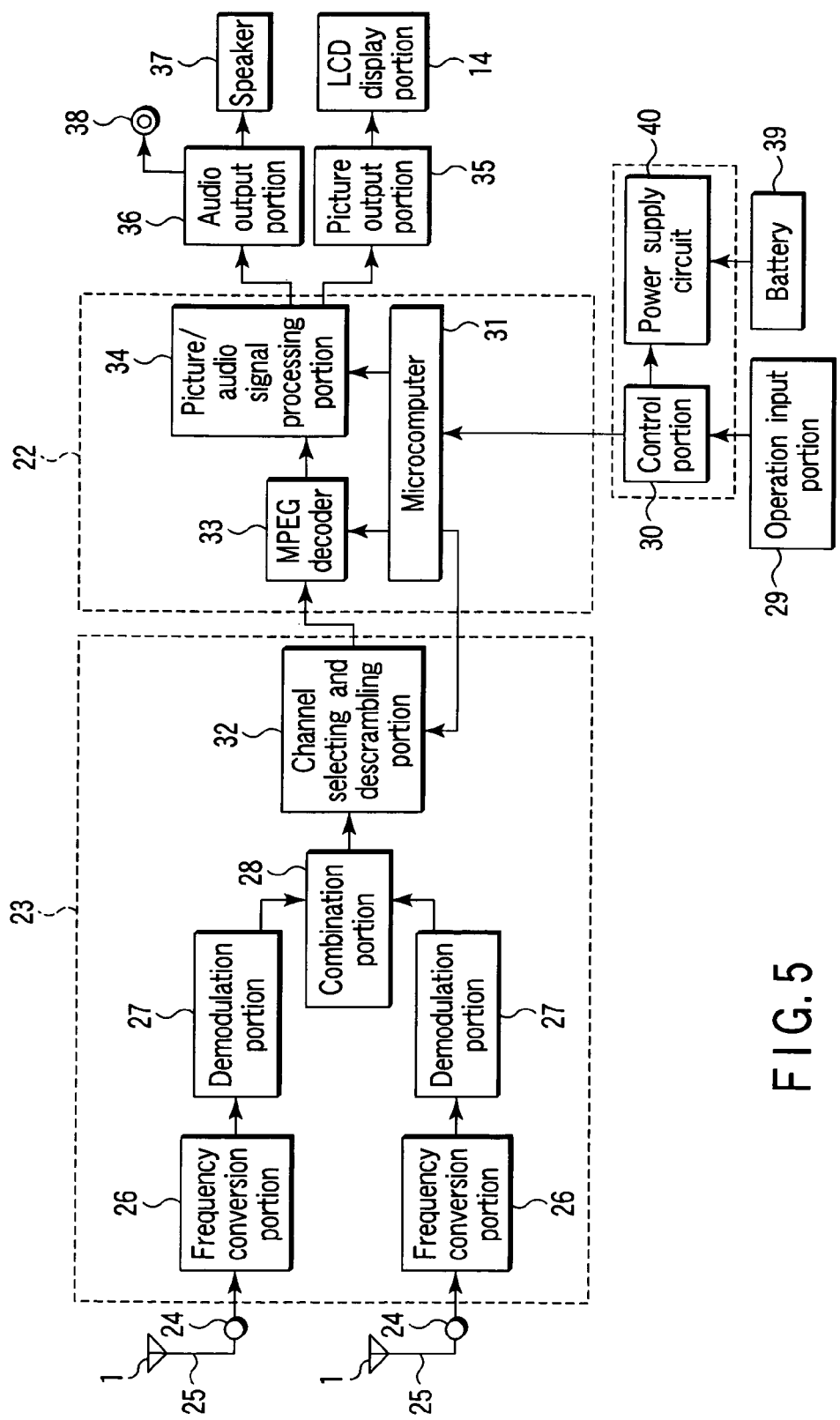
FIG. 5 is a block diagram showing a signal processing system of the broadcast receiving terminal in the first embodiment.

FIG. 5 shows the signal processing system of the above broadcast receiving terminal 10. In FIG. 5, the two antennas 1 are respectively connected via the cables 25 and the connectors 24 to two frequency conversion portions 26 where the frequency conversion processing is performed. Then, the signals are demodulated as data signals by demodulation portions 27 and the data signals are combined to one data signal by signal combining part 28.

The selection of a channel is performed as follows: when the user operates the operating button 15 of an operation input portion 29, a signal is applied to a control portion 30 to supply a channel selecting signal to a channel selecting and descrambling portion 32 from control means including a microcomputer 31.

The signal outputted from the channel selecting and descrambling portion 32 is supplied to a MPEG (Moving Picture Experts Group) decoder 33 and a digital picture/audio signal processing portion 34. The picture signal is subjected to a graphic multiple processing or the like to be converted into an analog signal and then is supplied to a picture output portion 35. This picture output portion 35 drives the liquid crystal display panel 14 on the basis of the inputted picture signal to display a picture.

Moreover, an audio signal is subjected to the adjustment of audio volume and the like, then is converted into an analog signal, is amplified by an audio output portion 36, is outputted as audio from a speaker 37 and is outputted also from an earphone or a headphone terminal 38.

In this respect, there is provided a battery 39 to be the operating power supply of the broadcast receiving terminal 10 and a power supply circuit 40 for generating power for respective circuits from the battery 39 is provided and is controlled by the control portion 30 according to a control signal from the operating button 16.

According to the first embodiment described above, the antennas 1 can have more stable gain and wide directivity. Therefore, it is possible to construct the portable broadcast receiving terminal 10 that can stably receive signals even in the mobile circumstances where the state of reception will vary.

Figure 6:
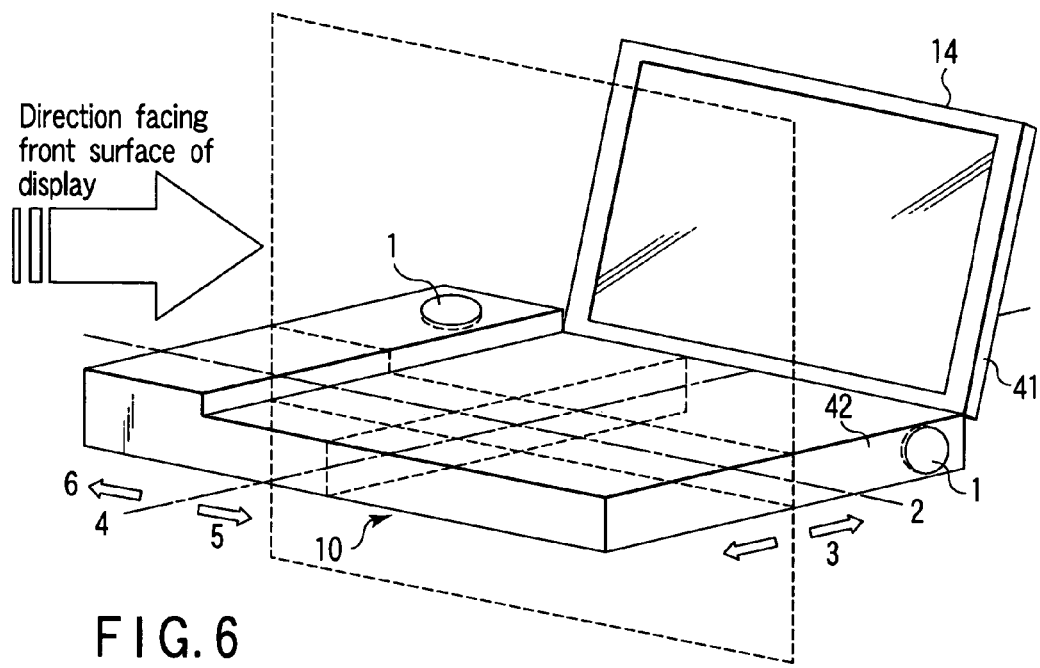
FIG. 6 shows a second embodiment of the invention and is a perspective view showing the positions where antennas of a broadcast receiving terminal are arranged.

Next, a second embodiment of the invention will be described. FIG. 6 shows an embodiment of packaging the antennas 1 of a structure having a function that a display casing portion 41 incorporating the liquid crystal display panel 14 of the broadcast receiving terminal 10 can move with respect to the main casing portion 42. The circuit and function of the broadcast receiving terminal 10 are the same as those in the first embodiment.

In FIG. 6, it is assumed that a region in the back of the intermediate position 2 for dividing the main casing portion 42 into two portions in a direction of depth when the user views the liquid crystal display panel 14 of the broadcast receiving terminal 10 from the front face side is a casing back portion 3.

Then, the antennas 1 are packaged respectively in a right region 5 and a left region 6 of the intermediate position 4 for dividing this casing back portion 3 into two left and right portions. The antennas 1 are constructed of plane patch antennas and in order to expand directivity as the broadcast receiving terminal 10, are arranged in different surfaces in the casing back portion 3 and packaged such that their respective radiant surfaces face different directions.

In this case, the distance between the two packaged antennas 1 is made not shorter than a quarter of the wavelength of a high-frequency signal to be received to draw the best effect of the diversity antenna.

Moreover, as is the case with the first embodiment, in order to make the user recognize the positions of the antennas 1 built-in the main casing portion 42, the portions of the main casing portion 42 where the antennas 1 are packaged may be partially raised and marked.

By employing these packaging methods, as is the case with the first embodiment, the portable broadcast receiving terminal 10 capable of receiving stable signals can be constructed.

In this respect, as for the positions of the antennas 1 in FIG. 6, the positions shown in the drawing are one example and the positions where the antennas 1 are arranged are not limited to the positions shown in the drawing. The positions of the antennas 1 may be modified so that the broadcast receiving terminal 10 can receive more stable signal levels under various receiving conditions.

Figure 7:
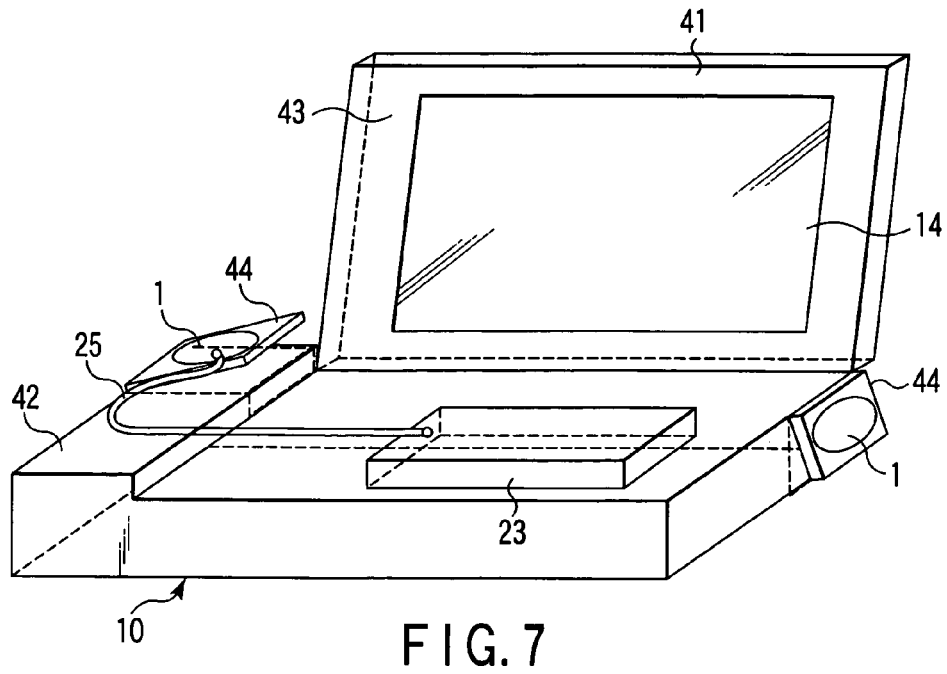
FIG. 7 shows a third embodiment of the invention and is a perspective view showing the state where antennas of a broadcast receiving terminal are mounted.

Next, a third embodiment of the invention will be described. FIG. 7 shows another method for packaging the antennas 1 in the broadcast receiving terminal 10 of the first and second embodiments.

Each of antenna casings 44 in FIG. 7 in which the antennas 1 are packaged is of a structure having a function that the antenna casing 44 can move with respect to the main casing portion 42. The circuit and other functions of the broadcast receiving terminal 10 are the same as those in the first and second embodiments.

Since the antenna case 44 can freely move with respect to the main casing portion 42, the orientation of the radiant surface of the built-in antenna 1 can be controlled.

If the user himself can freely control the state of reception of the antennas 1 under use conditions of the portable broadcast receiving terminal 10 in which the state of reception will vary, the user can improve the broadcast receiving terminal 10 into a stable receiving system in response to various conditions.

As for the cables 25 for connecting the antennas 1 to the block part 23, because the cables 25 are routed through the movable parts between the main casing portion 42 and the antenna casings 44, in consideration of durability, a flexible board having a microstrip line and a coplanar line is used for the cables 25.

Figure 8A:
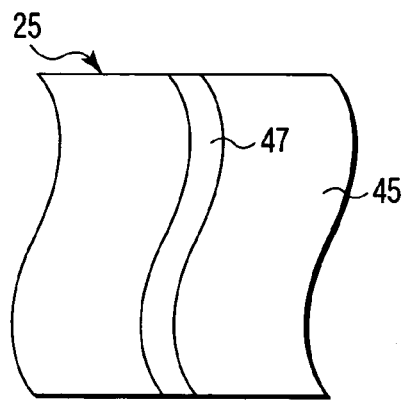
FIGS. 8A and 8B show an example of a flexible board for connecting an antenna and a block part in the third embodiment, respectively.
Figure 9A:
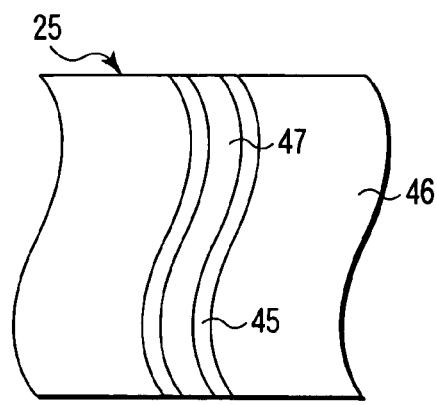
FIGS. 9A and 9B show another example of the flexible board for connecting the antenna and the block part in the third embodiment, respectively.
Figure 8B:
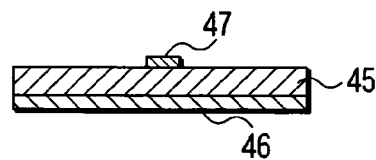
Figure 9B:
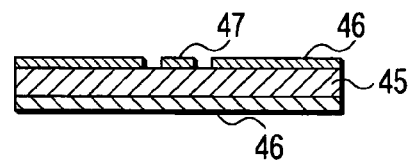

FIGS. 8A and 8B show a state in which a microstrip line is placed on a flexible board and FIGS. 9A and 9B show a state in which a coplanar line is placed on a flexible board. In both of the lines, a dielectric body 45 having a certain dielectric constant ∈r is a board and a line pattern placed a predetermined spacing away from a GND pattern 46 is a signal transmission line 47.

By constructing these lines of a thin flexible board, the durability of the cable 25 used for connecting portions moving at a relatively high frequency can be improved.

Moreover, as for the positions of the antennas 1 in FIG. 7, the positions shown in the drawing are one example and the positions where the antennas 1 are arranged are not limited to the positions shown in the drawing. The positions of the antennas 1 may be modified so that the broadcast receiving terminal 10 can receive more stable signal levels under various receiving conditions.

Figure 10:
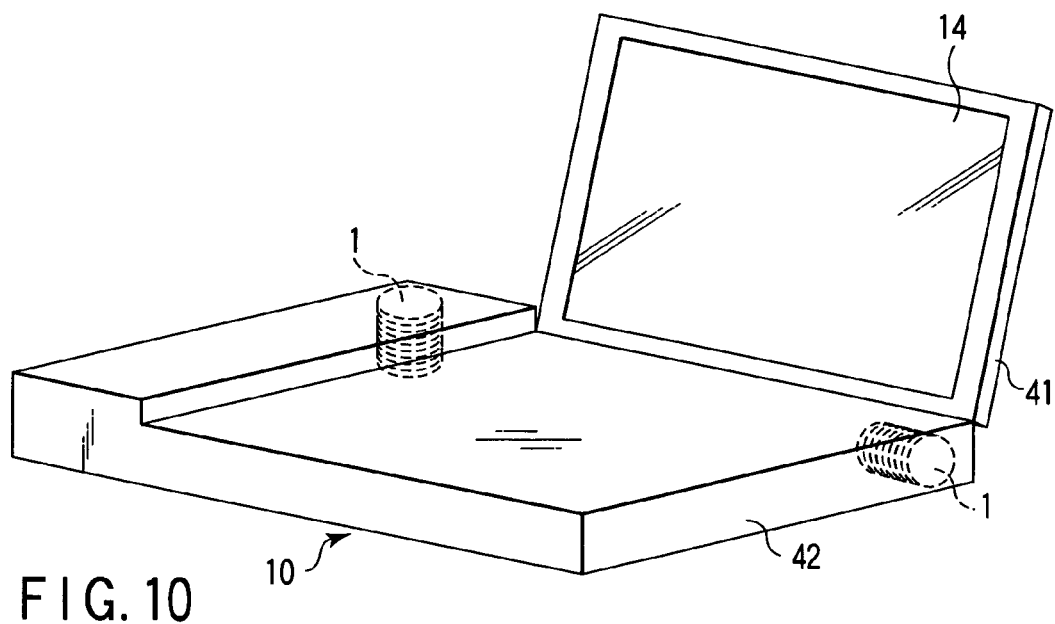
FIG. 10 shows a fourth embodiment of the invention and is a perspective view showing the kind of antenna of a broadcast receiving terminal.

Next, a fourth embodiment of the invention will be described. FIG. 10 shows a state in which helical antennas are used as the antennas 1 in the first to third embodiments. In FIG. 10 is shown an example in which the antennas 1 of the second embodiment of the first to third embodiments are replaced with the helical antennas.

Moreover, not only the helical antennas but also antennas for circularly polarized waves can be used as the antennas 1.

Incidentally, this invention is not limited to the above embodiments as they are, but constituent elements can be variously modified and put into practice within the spirit and scope of the invention during an implementation stage. Further, the suitable combination of the plurality of constituent elements disclosed in the above embodiments can create various inventions. For example, some constituent elements of the whole constituent elements disclosed in the embodiments can be removed. Still further, the constituent elements according to the different embodiments can be suitably combined with each other.

What is claimed is:

1. A high-frequency receiving unit comprising:
    a casing configured to incorporate a high-frequency circuit which receives a high-frequency signal and a signal processing circuit which obtains at least one of a picture signal and a data signal from the received high-frequency signal;
    a display disposed in an opening of the casing and configured to display an output of the signal processing circuit; and
    an antenna configured to receive the high-frequency signal and to supply it to the high-frequency circuit,
    wherein, when the display is viewed from the front at an angle perpendicular thereto, the antenna is disposed in any one of a top surface, a bottom surface, a right side surface, a left side surface and a back surface of the casing and located on the back side of an intemiediate position for dividing the casing into two portions in a direction of depth.

2. A high-frequency receiving unit according to claim 1, wherein the casing comprises:
    a main body casing section configured to incorporate a signal processing circuit for obtaining at least one of an image signal and a data signal from high-frequency signals received at the high-frequency circuit; and
    a display casing section having an aperture in which the display is provided, and being movably attached to the main body casing section,
    wherein, when the display is viewed from the front at an angle perpendicular thereto, said plurality of antennas are disposed in any one of a top surface, a bottom surface, a right side surface, a left side surface and a back surface of the casing and located on the back side of an intermediate position for dividing the casing into two portions in a direction of depth.

3. A high-frequency receiving unit comprising:
    a casing configured to incorporate a high-frequency circuit which receives a high-frequency signal and a signal processing circuit which obtains at least one of a picture signal and a data signal from the received high-frequency signal;
    a display disposed in an opening of the casing and configured to display an output of the signal processing circuit; and
    a plurality of antennas configured to receive the high-frequency signal and to supply it to the high-frequency circuit,
    wherein, when the display is viewed from the front at an angle perpendicular thereto, said plurality of antennas are disposed in any one of a top surface, a bottom surface, a right side surface, a left side surface and a back surface of the casing and located on the back side of an intermediate position for dividing the casing into two portions in a direction of depth.

4. A high-frequency receiving unit according to claim 3, wherein said plurality of antennas are disposed in a plurality of surfaces of the top surface, the bottom surface, the right side surface, the left side surface and the back surface of the back side of the casing.

5. A high-frequency receiving unit according to claim 3, wherein at least one of said plurality of antennas is disposed on the right side of an intermediate position for dividing the back portion of the casing into left and right portions and at least one of said plurality of antennas is disposed on the left side of the intermediate position.

6. A high-frequency receiving unit according to claim 3, wherein at least one of said plurality of antennas is disposed at a distance of 30 mm or more separate from at least one other antenna.

7. A high-frequency receiving unit according to claim 3, wherein the casing is constituted of a casing body configured to incorporate the signal processing circuit and a display casing configured to incorporate the display and to have a function that it can move with respect to the case body.

8. A high-frequency receiving unit according to claim 3, wherein the antenna is built in the casing.

9. A high-frequency receiving unit according to claim 8, wherein the case is raised in a portion in which the antenna is built.

10. A high-frequency receiving unit according to claim 8, wherein the portion of the casing in which the antenna is built has a marking to show the existence of the antenna.

11. A high-frequency receiving unit according to claim 3, wherein the antenna is mounted on the outside of the casing.

12. A high-frequency receiving unit according to claim 3, wherein at least one of the antennas is configured to able to move and has a function of varying an orientation of a radiant surface of the antenna or a distance between the antennas.

13. A high-frequency receiving unit according to claim 3, wherein either of a microstrip line placed on a flexible board and a coplanar line placed on a flexible board is used for connecting the antennas to the high-frequency circuit.

14. A high-frequency receiving unit according to claim 3, wherein the antenna is constituted of any one of a plane antenna, a helical antenna, and an antenna for circularly polarized waves.

15. A high-frequency receiving unit according to claim 3, wherein said plurality of antennas are provided such that their radiant surfaces face different directions.

16. A high-frequency receiving unit comprising:
    a casing configured to incorporate a high-frequency circuit which receives a high-frequency signal and a signal processing circuit which obtains at least one of a picture signal and a data signal from the received high-frequency signal;

a display disposed in an opening of the casing and configured to display an output of the signal processing circuit; and a plurality of antennas configured to receive the high-frequency signal and to supply it to the high-frequency circuit, wherein, when the display is viewed from the front at an angle perpendicular thereto, said plurality of antennas are disposed in any one of a top surface, a bottom surface, a right side surface, a left side surface and a back surface of the casing and located on the back side of an intermediate position for dividing the casing into two portions in a direction of depth, and wherein at least one of the plurality of antennas is disposed at a separate position from at least another antenna in a distance of one Quarter wavelength of the received signal or more.

* * * * *